W. H. HOLAHAN.
WHEEL.
APPLICATION FILED DEC. 12, 1918.

1,334,494.

Patented Mar. 23, 1920.

INVENTOR
W. H. Holahan
BY Strong & Townsend
his ATTORNEY

UNITED STATES PATENT OFFICE.

WILLIAM H. HOLAHAN, OF SAN FRANCISCO, CALIFORNIA, ASSIGNOR TO HOL-MOR WHEEL COMPANY, OF SAN FRANCISCO, CALIFORNIA, A CORPORATION OF CALIFORNIA.

WHEEL.

1,334,494.           Specification of Letters Patent.      Patented Mar. 23, 1920.

Application filed December 12, 1918. Serial No. 266,371.

*To all whom it may concern:*

Be it known that I, WILLIAM H. HOLAHAN, a citizen of the United States residing at the city and county of San Francisco and State of California, have invented new and useful Improvements in Wheels, of which the following is a specification.

This invention relates to wheels, and particularly to heavy duty wheels for trucks, tractors and the like which employ demountable rims.

One of the objects of the present invention is to provide an expanding wheel rim structure for frictionally securing the demountable rim against circumferential and lateral movement upon the wheel rim. Another object of the invention is to provide a screw actuated wedge mechanism for expanding the wheel rim. Further objects will hereinafter appear.

The invention consists of the parts and the construction, combination and arrangement of parts as hereinafter more fully described and claimed, having reference to the accompanying drawings, in which—

Figure 1:
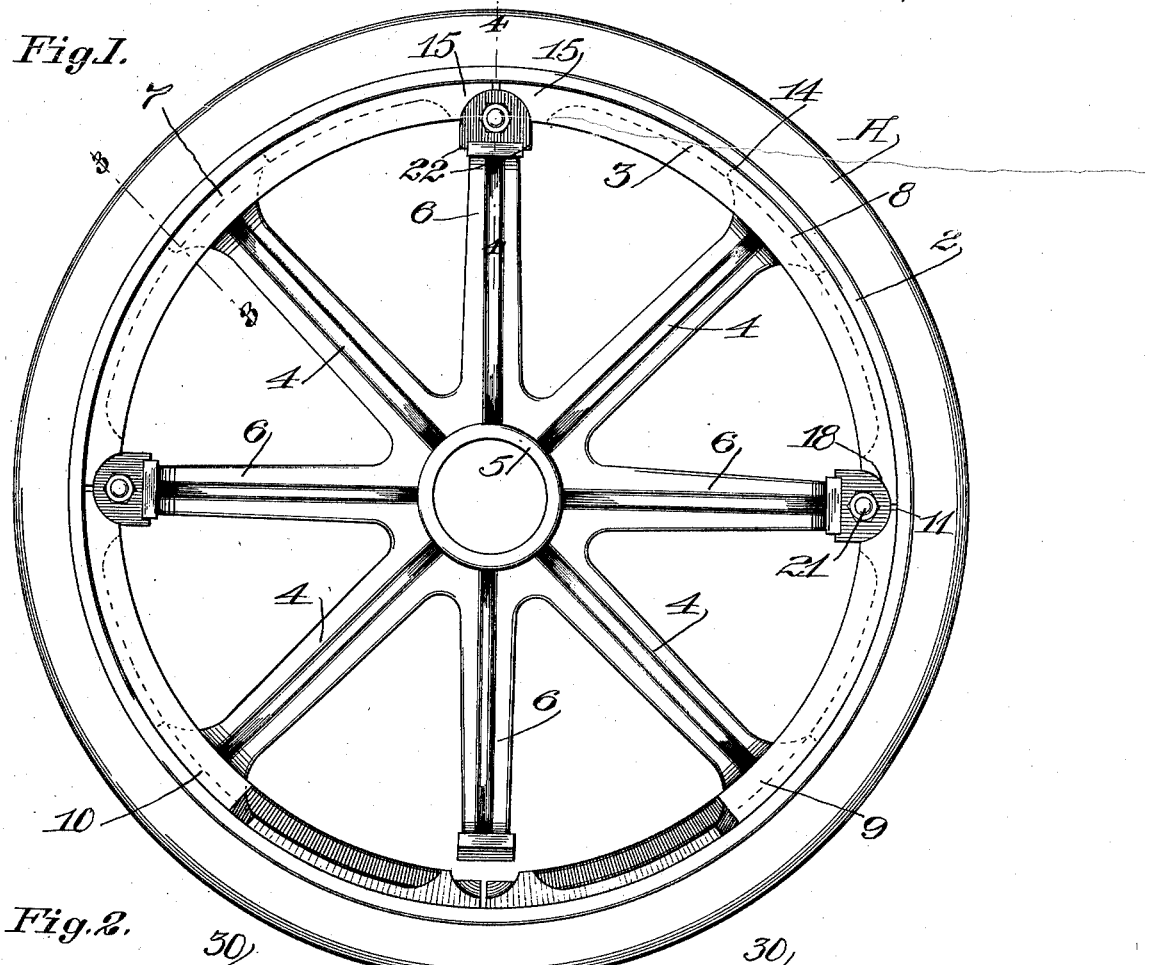
Figure 1 is a side elevation of the wheel, partly in section.

Referring to the drawings in detail, A indicates a standard form of solid rubber tire and 2 a demountable rim supporting the same. 3 indicates the wheel rim, 4 a series of spokes cast integral with the wheel rim and a hub 5, and 6 a series of spokes, the outer ends of which are separated with relation to the wheel rim, while the inner ends are cast integral with the spokes 4 and the hub 5. The wheel rim is, in this instance, divided into four sections 7, 8, 9 and 10, each centrally supported by a spoke 4. Each wheel rim section is entirely separated with relation to the other, as shown at 11, said separation being formed during the casting operation, or after the wheel has been cast by sawing the wheel rim through the points indicated, that is, in alinement with the spokes 6.

Figure 5:
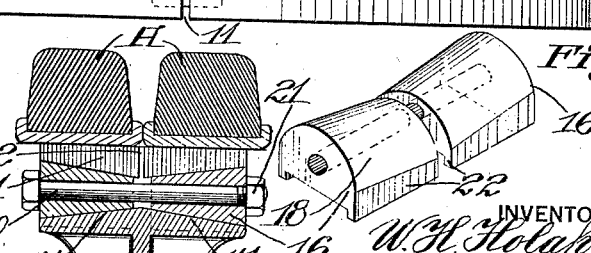
Fig. 5 is a perspective view of the expanding wedges.

Each wheel rim section is also split in the opposite direction, as indicated at 12, to permit each half to be independently expanded as will hereinafter be described. The slots or splits 12 may also be formed during the casting operation or by sawing the wheel rim after it is cast, as previously described. The slots 12 extend from the free ends of the wheel rim sections shown at 11 to a point adjacent the spokes 4, as indicated at 14. Each section thus formed may therefore be independently expanded and this is accomplished in the following manner:

Interposed between the spokes 6 and the free ends 15 of the wheel rim sections is a pair of wedges, such as shown at 16. The outer faces of the spokes 6 are tapered, as at 17, to receive the wedges and the outer faces of the wedges are tapered in the opposite direction, as shown at 18, the inclined outer faces of the spokes being flat, while the inclined outer faces of the wedges are rounded (see Figs. 1 and 5). The free ends of the wheel rim sections 15 are provided with tapered recesses for the reception of the rounding faces 18 of the wedges 16, thereby permitting said wedges to expand the free ends of the wheel rim sections when the wedges are drawn together by means of a screw 20 passing therethrough and a nut 21. The rounding and tapering faces formed in the free ends of the wheel rim sections secure the wedges against displacement as far as the wheel rim is concerned, while the flanges 22 formed on the sides of the wedges secure the same against displacement or lateral movement on the outer ends of the spokes 6. The wedges are in this manner positively locked against lateral movement and are furthermore locked against separating when subjected to a load by means of the bolts 20 and the nuts 21.

The wheel when cast is machined and finished in the following manner: The wedges 16 are first placed in position, while the casting is still in the rough and are then drawn together by means of the bolts 20 and nuts 21. This insertion of the wedges causes a radial expansion of the free ends of the wheel rim sections which distorts the same to the extent of throwing the wheel rim slightly out of round. The wheel is then placed in a lathe and the outer face of the wheel rim is machined and finished to present a true circular face. The wedges are then removed, thus permitting the free ends of the wheel rim sections to return to normal position. This will again destroy the perfect circular finish of the wheel as the inward movement of the free ends of the wheel rim sections will leave the center portion of each wheel rim section slightly higher than the free ends which have moved inwardly.

A demountable rim when applied will thus only contact with the high spots presented, therefore rendering it comparatively easy to apply the demountable rim. The wedges are then tightened by screwing up the nuts 21, thus drawing the wedges toward each other and again radially expanding the free ends of the wheel rim sections. The free ends will therefore return to a position where the outer face again represents a true circle and the wedges will at the same time exert an outward pressure to such an extent that the demountable rim becomes frictionally secured both against circumferential and lateral movement with relation to the wheel rim.

By first expanding the wheel rim before it is machined and then turning it down to a true circular finish two important results are obtained. First, it is possible to apply the demountable rims with comparative ease as the rim area is materially reduced when the expanding wedges are removed or loosened, and, secondly, a large gripping area or frictional face is provided when the free ends of the wheel rim are radially expanded by tightening the wedges, in fact, the whole face of the wheel rim will frictionally engage the inner face of the demountable rim, thus providing an area so large and a frictional grip so great that it is impossible for the demountable rim to turn peripherally or to move laterally upon the felly. This is all obtained without resorting to separate means for locking the wheel against peripheral movement and other means for locking the rim against lateral movement. Furthermore projecting lugs, wedges and other unnecessary mechanism are thus entirely obviated, thereby simplifying the construction of the wheel and materially decreasing the cost of manufacture.

Figure 2:
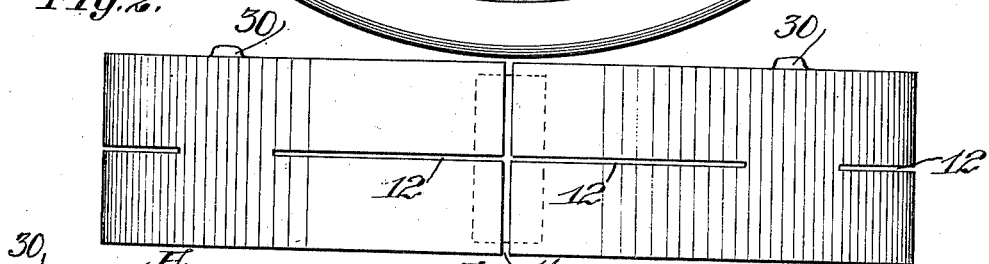
Fig. 2 is a plan view of the wheel showing the demountable rim and tire removed.
Figure 3:
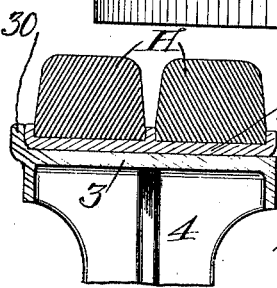
Fig. 3 is a cross section on the line 3—3 of Fig. 1.
Figure 4:
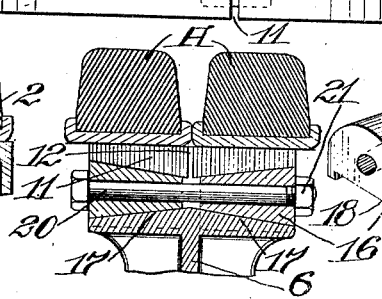
Fig. 4 is a cross section on the line 4—4 of Fig. 1.

By referring to Fig. 3, it will be seen that a single demountable rim is employed which carries two solid tires. Again, by referring to Fig. 4, it will be seen that two separate demountable rims are applied, each carrying a tire. In actual practice, it has been found that demountable rims of this character are variable in size as regards internal diameter. Any such variation is of no consequence when employing a wheel constructed as here shown, as each half of the wheel rim may be independently expanded due to the longitudinal slitting of the same, as shown at 12 (see Fig. 2), that is, the wedges when drawn up by means of the bolts 20 and the nuts 21 may move independent of each other. For instance, referring to Fig. 4, if the demountable rim on the left-hand side is slightly larger than the demountable rim on the right-hand side, then the wedge on the right-hand side would move until the corresponding rim is locked, while the wedge on the left-hand side would still continue moving until the other rim has been locked, this independent movement of one wedge with relation to the other being possible because the wheel rim is not only split laterally at a plurality of points, but also longitudinally, as shown.

In actual practice, I provide a series of stop lugs 30 on the inner side of the wheel rim. These lugs are cast integral with said wheel rim and they are only provided for preventing the demountable rim from being forced laterally beyond the position it should assume. They are not provided for the purpose of locking the rim against lateral movement, but only serve as stop lugs when applying the rim, the frictional engagement of the expanding wheel rim sections being entirely depended upon to secure the demountable rim or rims both against lateral and circumferential movement.

While the wedges are here shown as provided with rounded faces on one side and flat faces on the opposite side, I wish it understood that such shapes may be varied; similarly, that the materials and finish of the several parts and the design employed may be such as the experience and judgment of the manufacturer may dictate.

Having thus described my invention, what I claim and desire to secure by Letters Patent is:

1. A wheel comprising a hub, a plurality of spokes radially disposed with relation thereto, a wheel rim supported by said spokes, said wheel rim being laterally divided into a plurality of separated sections each centrally supported by a spoke, a demountable rim adapted to be received by said wheel rim and means for forcing the free ends of the wheel rim sections outwardly away from the spokes to permit said wheel rim sections to frictionally engage the inner face of the demountable rim to secure the same against peripheral and lateral movement on the wheel rim sections.

2. A wheel comprising a hub, a plurality of spokes radially disposed with relation thereto, a wheel rim supported by said spokes, said wheel rim being laterally divided into a plurality of separated sections, each centrally supported by a spoke, a demountable rim adapted to be received by said wheel rim sections, a plurality of spokes interposed between the first-named spokes, said spokes being positioned in alinement with the free ends of the wheel rim sections, and means interposed between said spokes and the free ends of the wheel rim sections adapted to force said wheel rim sections, thereby causing said wheel rim sections to frictionally engage and secure the demountable rim both against peripheral and lateral movement.

3. A wheel comprising a hub, a plurality of spokes radially disposed with relation thereto, a wheel rim supported by said spokes, said wheel rim being laterally divided into a plurality of separated sections, each centrally supported by a spoke, a demountable rim adapted to be received by said wheel rim sections, a plurality of spokes interposed between the first-named spokes, said spokes being positioned in alinement with the free ends of the wheel rim sections, and a wedge member interposed between each spoke and the free ends of the wheel rim sections, said wedges adapted to force the free ends of the wheel rim sections outwardly, thereby causing the same to frictionally grip and secure the demountable rim.

4. A wheel comprising a hub, a plurality of spokes radially disposed with relation thereto, a wheel rim supported by said spokes, said wheel rim being laterally divided into a plurality of separated sections, each centrally supported by a spoke, a demountable rim adapted to be received by said wheel rim, a plurality of spokes interposed between the first-named spokes, said spokes being positioned in alinement with the free ends of the wheel rim sections, a pair of wedge members interposed between said spokes and the free ends of the wheel rim sections, and means for tightening each pair of wedges in unison to force the free ends of the wheel rim sections outwardly and thereby grip the demountable rim to secure the same against lateral and circumferential movement upon the wheel rim sections.

5. A wheel comprising a hub, a plurality of spokes radially disposed with relation thereto, a wheel rim supported by said spokes, said wheel rim being laterally divided into a plurality of separated sections, and said wheel rim sections being also longitudinally divided at each end, a demountable rim adapted to be received by the wheel rim sections, and means for forcing said wheel rim sections outwardly to frictionally secure the demountable rim against circumferential and lateral movement on said wheel rim sections.

6. A wheel comprising a hub, a plurality of spokes radially disposed with relation thereto, a wheel rim supported by said spokes, said wheel rim being laterally divided into a plurality of separated sections and said wheel rim sections being also longitudinally divided at each end, a demountable rim adapted to be received by the wheel rim sections, a plurality of spokes interposed between the first-named spokes, said spokes being positioned in alinement with the free ends of the wheel rim sections and being separated therefrom, said spokes being provided at their outer ends with inclined faces, a pair of wedges adapted to be interposed between said inclined faces and the free ends of the wheel rim sections, and means for tightening said wedges to force the free ends of the wheel rim sections outwardly, thereby causing the same to frictionally engage the demountable rim.

7. A wheel comprising a hub and a plurality of spokes, a plurality of independent wheel rim sections centrally supported one section by each spoke, a demountable rim adapted to be received by said wheel rim sections and means for forcing the free ends of the several wheel rim sections outwardly.

8. A wheel comprising a hub, spokes and a wheel rim, said wheel rim being laterally divided into a plurality of sections, each of said sections having outwardly movable ends and each section being centrally supported by alternate spokes, and means for forcing the ends of the several wheel rim sections outwardly.

In testimony whereof I have hereunto set my hand in the presence of two subscribing witnesses.

WILLIAM H. HOLAHAN.

Witnesses:
  JOHN H. HERRING,
  W. W. HEALEY.